United States Patent [19]
Phillips et al.

[11] 4,245,757
[45] Jan. 20, 1981

[54] DOSE ADJUSTMENT MECHANISM FOR A DRENCH GUN

[75] Inventors: Ian R. Phillips, Killara; Mervyn F. Reynolds, Balgowlah, both of Australia

[73] Assignee: N. J. Phillips Pty. Limited, New South Wales, Australia

[21] Appl. No.: 57,533

[22] Filed: Jul. 13, 1979

[51] Int. Cl.³ .............................................. B67D 5/18
[52] U.S. Cl. ...................................... 222/43; 222/309
[58] Field of Search ............... 222/287, 309, 474, 340, 222/41, 43; 128/218 C, 234

[56] References Cited
U.S. PATENT DOCUMENTS

| | | | |
|---|---|---|---|
| 2,074,401 | 3/1937 | Kauzal | 128/234 X |
| 3,261,509 | 7/1966 | Shevell | 222/309 |

Primary Examiner—Stanley H. Tollberg
Attorney, Agent, or Firm—Ladas & Parry

[57] ABSTRACT

A drench gun having at least one interacting bore and piston to define a variable volume working space, a liquid exit from the working space, a liquid inlet to said working space, and a dose adjustment mechanism to vary the volume swept by the piston to adjust the dosage delivered by the gun. The dose adjustment mechanism comprises a body plug formed in two halves having a passage extending longitudinally therethrough, a movable sleeve located in the passage to abut the piston to adjustably limit movement thereto, and an adjustor projecting into the sleeve and adapted to rotate around the axis thereof. The adjustor and body plug are adapted to engage the sleeve so that upon rotation of said adjustor said sleeve is moved along longitudinally relative to the piston.

6 Claims, 3 Drawing Figures

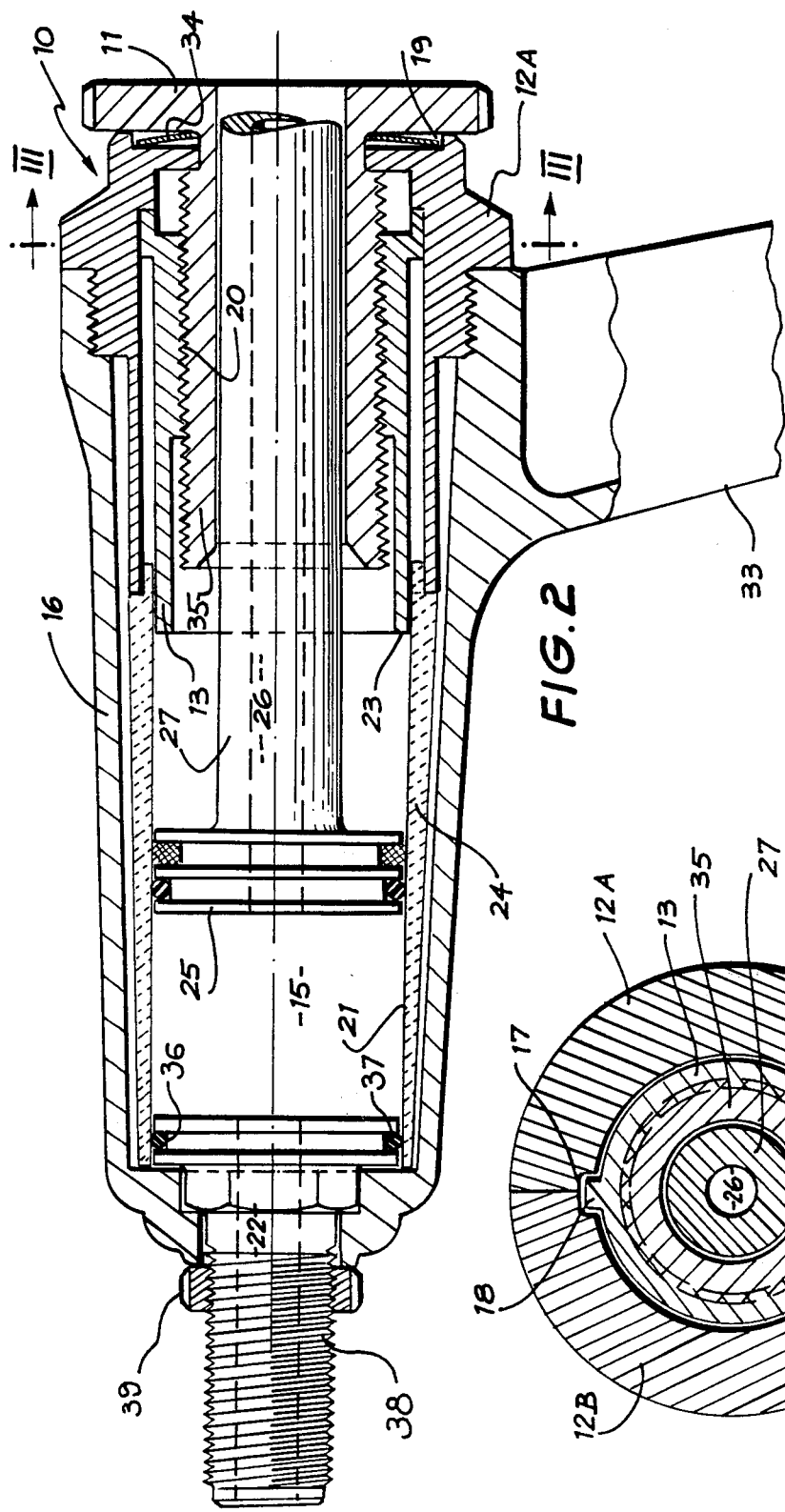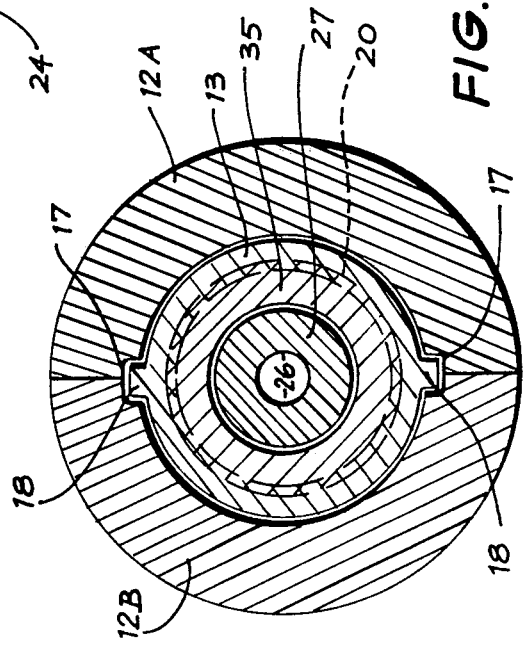

DOSE ADJUSTMENT MECHANISM FOR A DRENCH GUN

The present invention relates to drench guns or syringes for the dosing of animals, especially sheep and cattle, and more particularly but not exclusively to improvements in adjustable dosage guns or syringes.

It is desirable in drench guns that means be provided to enable a volume of dosage, delivered into an animal, to be predetermined. This is usually accomplished by limiting the travel of the piston within the gun. Such limiting means, which incorporated in the body of the gun rather than the handle or trigger portion, have contributed greatly to the length of the gun and its complexity and accordingly have unduly contributed to the cost of manufacture.

It is the object of the present invention to overcome or substantially ameliorate the above disadvantages.

There is disclosed herein a dose adjustment mechanism for a drench gun or syringe having a body with at least one interacting bore and piston defining a variable volume working space, which piston is moved by a connecting rod extending outwardly from within the bore, said adjustment mechanism comprising a body plug to be fixed to the body of the gun at a location adjacent a free end of the bore, a passage extending longitudinally through said plug with respect to said bore, an adjustment sleeve located in said passage for movement longitudinally therealong and adapted to project into said bore to engage said piston to adjustably limit movement of said piston, a dose adjustor extending longitudinally through the interior of said sleeve, said adjustor being adapted to be rotated about the axis of said sleeve, and wherein said plug and adjustor are adapted to engage said sleeve to cause the longitudinal movement thereof in response to the rotation of said adjustor.

A preferred form of the present invention will now be described by way of example with reference to the accompanying drawings in which:

FIG. 2 is a sectioned side elevation of a portion of the gun of FIG. 1, and

FIG. 3 is a section of the gun of FIG. 1 taken along the line III—III of FIG. 2.

Figure 1:
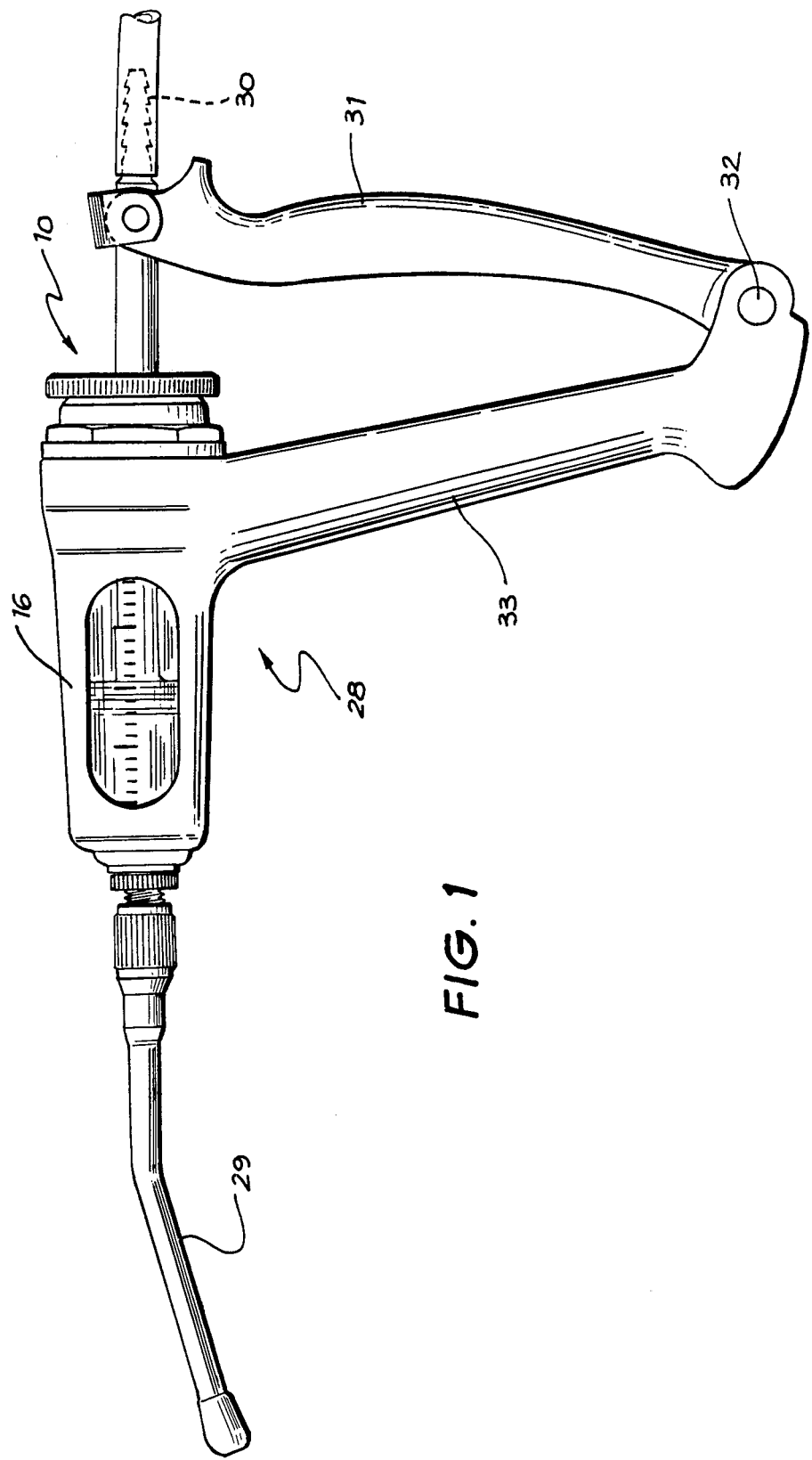
FIG. 1 illustrates a drench gun in side elevation.

In the drawings there is depicted the body 16 of a drench gun 28 to which is threadably fixed a dose adjustment mechanism 10. The gun 28 has an outlet nozzle 29, an inlet conduit 30 and a trigger 31 pivotally attached to the body 16 by pin 32. The trigger 31 is biased to rotate clockwise under the influence of a leaf spring (not depicted) extending between the handle 33 and the trigger 31. The mechanism 10 comprises three major components, the body plug 12, dose adjustor 11 and sleeve 13.

Defined within the body 16 by cylinder 24 is chamber 15 to receive a piston 25 which slidingly engages the chamber wall 21 to define within the cylinder wall 21 a variable volume working space. This space has an outlet passage 22 and an inlet passage 26 that extends through the piston 25 and piston rod 27. The other end of the piston rod 27 is attached to the trigger 31 of the gun 28 so as to be actuated thereby to move the piston 25. Movement of the piston 25 in a rightward direction is limited by engagement with the annular surface 23 of the sleeves 13 so that the location of the sleeve 13 determines the volume swept by the piston 25.

To adjust the dosage delivered the sleeve 13 is moved by the dose adjustor 11. The adjustor 11 has a tubular part 35 which when rotated causes longitudinal movement of the sleeve 13 by engagement of threaded portion 20 of sleeve 13 with the threaded outer surface of the dose adjustor 11. To hold the dose adjustor 11 in position and to prevent rotation of the sleeve 13 with the dose adjustor 11 there is provided the body plug 12 which is composed of two halves 12A and 12B. In this case the halves 12A and 12B are mirror images with only one of the halves depicted in FIG. 2. Together the body plug halves 12A and 12B define slots 17 to slidably receive tongues 18 to prevent rotation of the sleeves 13 with the dose adjustor 11. This causes the longitudinal movement of the sleeve 13 in response to the rotation of the adjustor 11. Additionally the body plug halves 12A and 12B define an annular recess 19 to receive a wave washer 34 to tension the dose adjustor 11.

It should be appreciated that as an alternative the sleeve 13 and body plug 12 could be threadably engaged and the dose adjustor 11 and sleeve 13 engaged by means of a slot and tongue. Still further the adjustment mechanism 10 could be located at the nozzle end of the body 16 with the liquid outlet extending through the dose adjustor 11. With this arrangement the sleeve 13 abuts the front of the piston 25. As a still further modification the liquid inlet need not pass through the piston rod 27 but may be located at the nozzle end of the body 16.

In the construction of this preferred embodiment, the cylinder 24 is secured in position by abutting the nozzle end of the interior of the body 16 and engaging the body plug 12 by an annular lip. The cylinder 24 is also preferably formed of transparent plastics material and is marked with graduations so that the position of the piston can be determined.

The chamber 15 is sealingly closed at its left hand and by a closure member 38 having a slot 36 and an "O" ring 37. The member 38 is secured in position by a threaded ring 39. The cylinder 24, although having a cylindrical chamber wall 21, has a truncated conical outer surface and is removable from within the hollow body 16 once the body plug 10 has been removed.

What we claim is:

1. A dose adjustment mechanism for a drench gun or syringe having a body with at least one interacting bore and piston defining a variable volume working space, which piston is moved by a connecting rod extending outwardly from within the bore, said adjustment mechanism comprising a body plug to be fixed to the body of the gun at a location adjacent a free end of the bore, a passage extending longtudinally through said plug with respect to said bore and having a longitudinal slot extending along said passage, an adjustment sleeve located in said passage and movable therealong, said sleeve having a projecting tongue slidably located within the slot so as to be restricted thereby to move longitudinally along said passage and to prevent rotation of the sleeve about the longitudinal axis of the passage, said sleeve being internally threaded, a dose adjustor extending longitudinally through said sleeve and being externally threaded so as to be threadably engaged within said sleeve so that rotation of said adjustor causes longitudinal movement of said sleeve.

2. The dose adjustment mechanism of claim 1 wherein the dose adjustor is adapted to be fixed relative to the body but allowed to rotate about the axis of said passage.

3. The dose adjustment mechanism of claim 2 wherein said adjustor has a longitudinal passage to provide for the location of and movement of the connecting rod therethrough.

4. The dose adjustment mechanism of claim 3 wherein said body plug is divided longitudinally into halves which combine to surround said sleeve.

5. The dose adjustment mechanism of claim 4 wherein the halves are mirror images of each other.

6. A drench gun comprising a body, having a longitudinal hollow open at each end, a bore defining member located in said hollow, said bore being open ended and terminating adjacent the end openings of said hollow, a closure member extending through one end of said body and sealingly closing one end of said bore, a piston slidingly located in said bore and cooperating therewith to define a variable volume working space located between said closure member and piston, a body plug closing the other open end of said hollow, a passage extending longitudinally through said plug with respect to said bore, an adjustment sleeve located in said passage for movement longitudinally therealong and adapted to project into said bore to engage said piston to adjustably limit movement of said piston, a dose adjustor extending longitudinally through the interior of said sleeve, said adjustor being fixed relative to said body plug but adapted to be rotated about the axis of said sleeve, said plug and adjustor are adapted to engage said sleeve to cause the longitudinal movement thereof in response to the rotation of said adjustor, a passage extending longitudinally through said closure member providing a liquid outlet from said working space, a passage extending longitudinally through said adjustor, a piston rod fixed to said piston and extending therefrom so as to project outwardly from within said bore and extend through the passage in said adjustor, a passage extending longitudinally through said piston and rod providing a liquid inlet to said working space, a trigger attached to said piston rod to cause movement thereof to move said piston, and said body and body plug are adapted to engage said bore defining member to secure said member within the hollow of said body.

* * * * *